US008613657B2

(12) United States Patent
Richard et al.

(10) Patent No.: US 8,613,657 B2
(45) Date of Patent: Dec. 24, 2013

(54) SYSTEM AND METHOD FOR PERMITTING IDENTIFICATION AND COUNTING OF GAMING CHIPS

(76) Inventors: Christian Richard, Dorval (CA); Ronald N. Miller, Toronto (CA); Guy-Armand Kamendje, Ile des Soeurs (CA)

(*) Notice: Subject to any disclaimer, the term of this patent is extended or adjusted under 35 U.S.C. 154(b) by 140 days.

(21) Appl. No.: 11/574,170

(22) PCT Filed: Sep. 1, 2005

(86) PCT No.: PCT/CA2005/001338
§ 371 (c)(1),
(2), (4) Date: Dec. 2, 2008

(87) PCT Pub. No.: WO2006/024171
PCT Pub. Date: Mar. 9, 2006

(65) Prior Publication Data
US 2009/0075723 A1 Mar. 19, 2009

Related U.S. Application Data

(60) Provisional application No. 60/606,155, filed on Sep. 1, 2004.

(51) Int. Cl.
*A63F 13/00* (2006.01)

(52) U.S. Cl.
USPC .................................... 463/25; 463/1; 463/29

(58) Field of Classification Search
USPC ................................ 463/11, 25, 47; 235/493
See application file for complete search history.

(56) References Cited

U.S. PATENT DOCUMENTS

| | | | | |
|---|---|---|---|---|
| 3,766,452 | A * | 10/1973 | Burpee et al. | 194/214 |
| 4,210,912 | A * | 7/1980 | Naidich et al. | 342/110 |
| 5,166,502 | A | 11/1992 | Rendleman et al. | |
| 5,378,880 | A * | 1/1995 | Eberhardt | 235/439 |
| 5,406,264 | A * | 4/1995 | Plonsky et al. | 235/493 |
| 5,651,548 | A | 7/1997 | French et al. | |
| 5,735,742 | A | 4/1998 | French | |
| 6,659,875 | B2 * | 12/2003 | Purton | 463/47 |
| 6,685,564 | B2 * | 2/2004 | Oliver | 463/25 |
| 2003/0022714 | A1 * | 1/2003 | Oliver | 463/25 |
| 2004/0149049 | A1 * | 8/2004 | Kuzik et al. | 73/862.453 |
| 2004/0229682 | A1 * | 11/2004 | Gelinotte | 463/25 |
| 2005/0054408 | A1 * | 3/2005 | Steil et al. | 463/11 |

OTHER PUBLICATIONS

Reichi "Performance Analysis of Polymer based Antenna-Coils for RFID", 2002, IEEE.*

* cited by examiner

*Primary Examiner* — Paul A D'Agostino
*Assistant Examiner* — Ankit Doshi
(74) *Attorney, Agent, or Firm* — Pierce Atwood LLP; Kevin M. Farrell; David J. Wilson

(57) ABSTRACT

A system that allows precise identification and counting of appropriately equipped gaming chips inside specified zones on a gambling table is disclosed. The system relies on near field magnetic coupling technology whereby a primary looped conductor placed in a gaming zone couples a sufficient amount of energy into one or a plurality of looped conductors located inside gaming chips through a magnetic field of known characteristic.

21 Claims, 9 Drawing Sheets

(a)
(b)
(c)
Flux density normal to plot line
AA'
BB'
152
153
154
155
156
157
158
160
161
162
163
Ubitrak
XXX

SYSTEM AND METHOD FOR PERMITTING IDENTIFICATION AND COUNTING OF GAMING CHIPS

FIELD OF THE INVENTION

This invention relates to the use of radio frequency identification technology for identification and counting of gaming chips on gambling tables within casinos and, more specifically to radio frequency identification couplers for radio frequency identification systems.

BACKGROUND OF THE INVENTION

Among all the approaches and measures that have been presented in the past years as concrete solutions for deterring counterfeiting and prevent unlawful and fraudulent wins within casinos, RFID-based solutions have received the greatest attention from both the industry and research communities.

Radio Frequency Identification technology is currently widely used in multiple industry sectors including manufacturing, transportation, postal tracking, medical, pharmaceutical and highway toll management. A typical RFID system configuration comprises an RFID transponder usually located on the object to be identified, an RFID interrogator or reader and a computing device. The interrogator is typically made of a radio frequency module, a control unit and a coupling element that transfers a sufficient amount of energy to the transponder. The transponder actually carries the data and it normally consists of a coupling element and an electronic microchip.

Several patents pertaining to RFID-based casino gaming chip monitoring for anti-counterfeiting purposes and player tracking have been issued. U.S. Pat. No. 5,166,502 (Rendelman et al.) shows a construction of radio frequency transponder embedded in a gaming chip. The transponder is tagged with information concerning the chip such as chip identity and value. The particular transponder described in that patent was specifically designed to work with slot machines. However, extending the application field of aforementioned chip to gaming tables such as black jack tables or baccarat was not considered in this patent, and it would not work because the information contained in the chip cannot be changed.

In U.S. Pat. Nos. 5,651,548 and 5,735,742, French et al. presents other RFID-based apparatus and methods of tracking gaming chip movement within casinos. These methods address the flaws of the previous patent by allowing chip tracking at various places within the casino including gaming tables and chip trays. Possibility of reading and writing in the integrated circuit containing token information is also explored. However, the solution proposed in French et al. is difficult to implement because an RF antenna configured the way it is described in the patent, would radiate on adjacent betting positions. This means that while interrogating chips lying on a given position, chips located on adjacent betting position will respond as well. French et al. does not disclose any method to control the radiating behaviour of the antenna. FIG. 1 (*a, b, c, d, e* and *f*), identified as Prior Art, illustrates the radiation pattern of center driven dipole antennas of various lengths (operating at 14 MHz) of the type that may be considered for use under a gaming table because of their simple construction. The plot shows the E field (radiated) for antennas whose length are ¼, ⅜, ½ and 1⅛ times the wavelength. For shorter antenna, the beam width is quite wide and approaches 90 degrees. With decreasing antenna size, the beam also decreases but this also introduces side lobes as can be seen on FIG. 1 (*d* and *f*) This means that for reasonable sized antenna structures that could be placed under a gaming table; the "illuminated" area is quite large and not compatible with the sizes and spatial discrimination needed for chip localization on the surfaces of gaming tables. Increasing the operating frequency could be though as a possible solution since this would apparently decrease the wavelength and thus decrease the dipole length. However, radio spectrum usage allocations charts restrict the use of various frequency bands e.g., ISM bands within defined power limits.

Further, French et al. does not address the issue of malicious players which could try to defeat the system by bringing strong interference sources in the close vicinity of the system. The use of shielding layers made out of appropriate material in this patent efficiently solves this problem.

SUMMARY OF THE INVENTION

A system that allows precise identification and counting of appropriately equipped gaming chips inside specified zones on a gambling table is disclosed. The system relies on near field magnetic coupling technology whereby a primary looped conductor couples sufficient amount of energy into one or a plurality of looped conductors through a magnetic field of known characteristic. The alternating current that circulates might be phase, frequency, time or code modulated so as to introduce data transmission capabilities towards the gaming chips. Near field magnetic coupling technology is used here in order to allow efficient energy transfer from the gaming table coupling loop to the gaming chip receiver loop in accordance with the transformer principle whereby a controlled amount of energy is transferred from the primary winding of a transformer to its secondary. The efficiency of the energy transfer is dictated by the coupling factor between the coupling loop and the receiving loop which in turns solely depends on the geometry of the two loops.

More specifically, the present invention provides A system for permitting identification and counting of gaming chips, comprising:

- a set of gaming chips, each gaming chip of said set of gaming chips including at least one looped conductor and an integrated circuit operatively connected to said looped conductor, said integrated circuit including identification data; and
- at least one gaming table, said gaming table being provided with a primary looped conductor for each gaming zone on said gaming table and an electronic module operatively associated with each looped conductor, said electronic module providing a current of predetermined amplitude and frequency in order to induce a magnetic field and for receiving and interpreting a signal received;
- whereby, when said gaming chip is in the vicinity of said primary looped conductor, near field magnetic coupling occurs between the looped conductor of said gaming chip and said primary looped conductor, whereby information is transmitted from said gaming chip to said electronic module in the form of a signal.

The size and other parameters of the coupling loops as well as the amplitude of the alternating current circulating through the coupling loops are selected so as to shape the magnetic field generated by the primary loop. Further, size and other parameters such as resonant frequency of the receiver loop are selected so as to allow reliable read and write of a stack of up to 20 gaming chips.

BRIEF DESCRIPTION OF THE DRAWINGS

The present invention will be better understood after having read a description of a preferred embodiment thereof, made in reference to the following drawings in which:

FIG. 4 (*b*) illustrates how the inlay carrying the loop can be encapsulated into a gaming chip FIG. 4 (*c*) illustrates how to combine the RFID inlay together with resonant magnetic or metallic strip in order to efficiently implement AES.

DESCRIPTION OF PREFERRED EMBODIMENTS OF THE INVENTION

Figure 1:
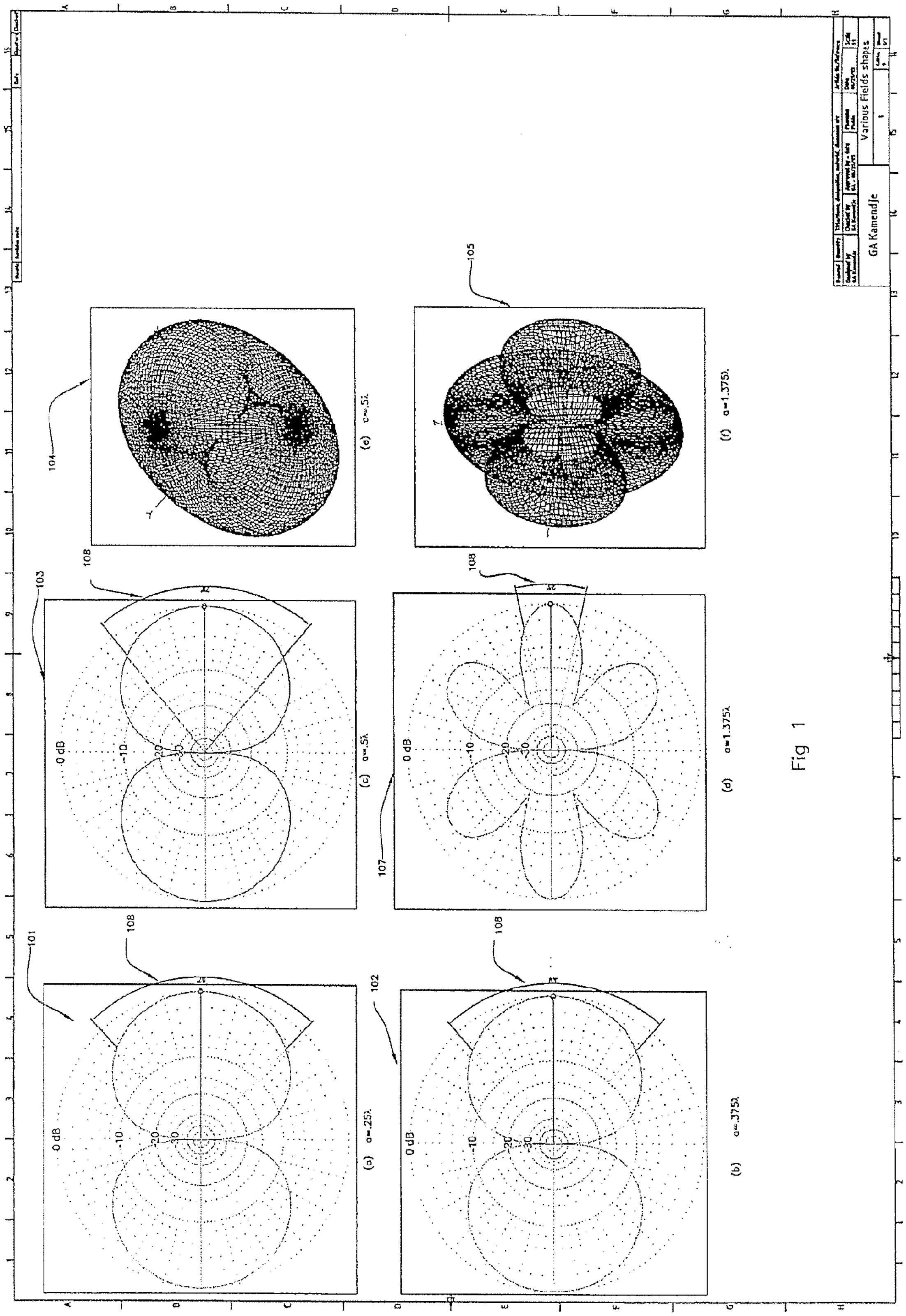
FIG. 1 depicts the far field antenna radiation pattern of center-driven dipoles of various lengths operating at 14 MHz (sinusoidal current distribution). The −3 dB degree beam width is particularly highlighted.
Figure 2:
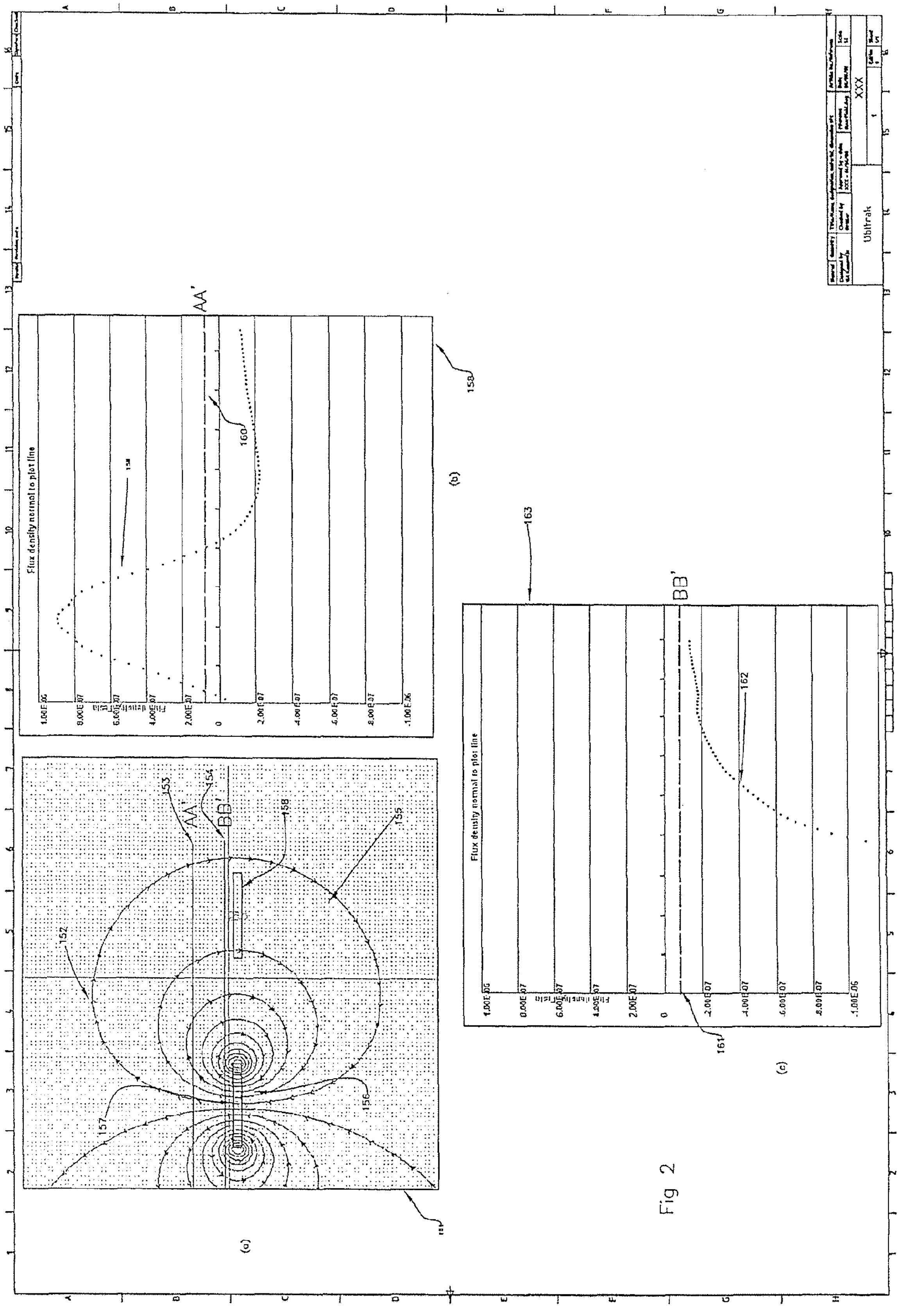
FIG. 2 depicts the near zone vertical plane field pattern of an electrically small loop. The flux density along the plot line is depicted as well as the threshold value needed for successful activation of an RFID chip located within this field.
Figure 3A:
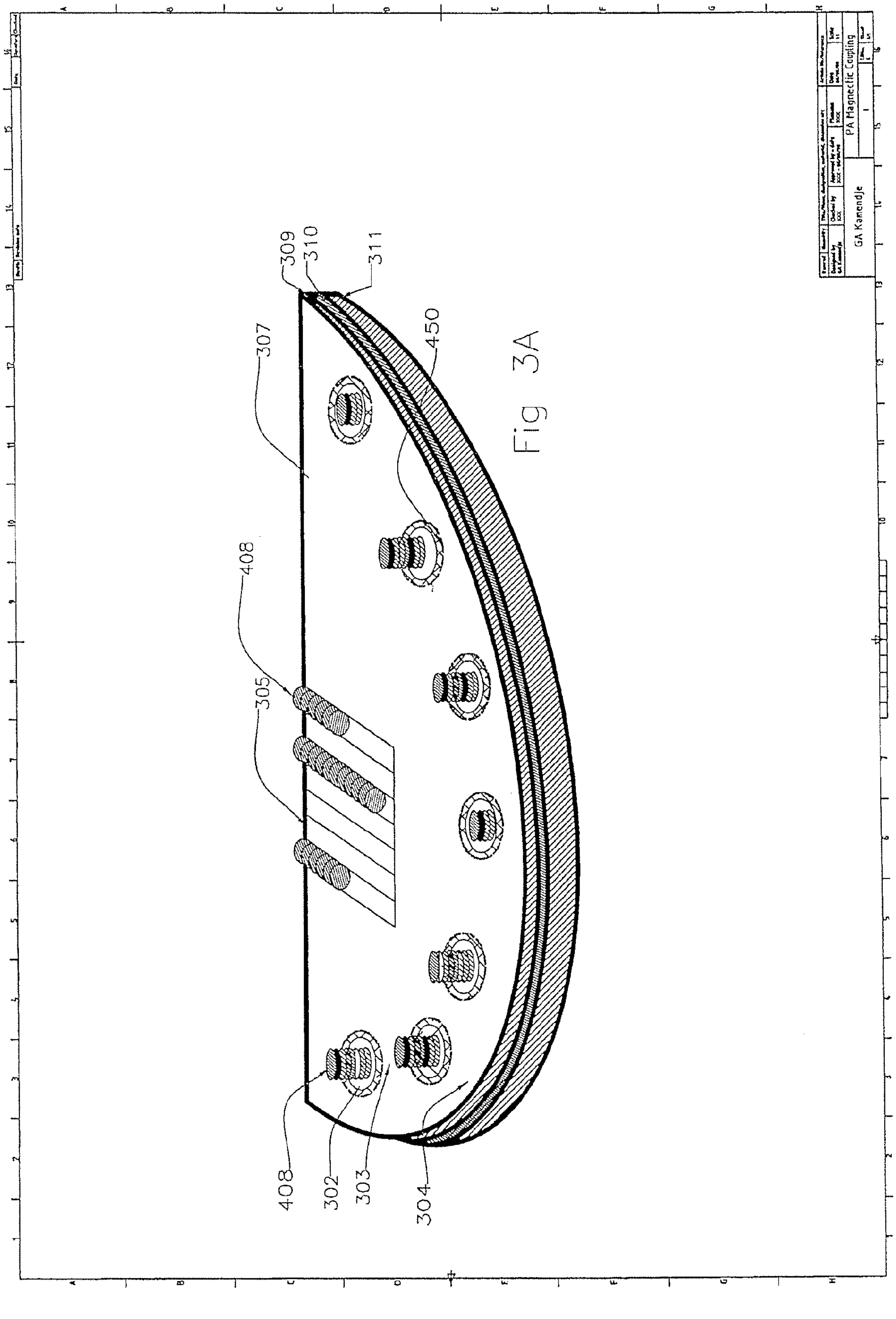
FIG. 3A is a perspective view of a Black Jack Gaming table with embedded coupling looped conductors together with gaming chips located on a betting position over the coupling conductors.

Referring now to FIGS. 1 to 8, and more specifically FIG. 3, there is shown a preferred embodiment of the invention disclosed herein.

A plurality of primary looped conductors 450 are installed within a gaming table, such as Black Jack table 307. The volume 518 illuminated by the magnetic field created by the looped conductors defines a gaming zones 302 within which gaming chips 408 have to be identified and counted. Outside these zones and particularly between these zones 303, there should be no communication between the gaming chips and the interrogator 502. These no communication zones 302 ensure that cross reading from one first conductor to another conductor is inhibited. This is achieved through magnetic field control couplers 517 located near each primary coupler (308). All the field control couplers are connected to an active field control device that computes the field shaping parameters based on the information returned by the field control couplers.

Through the conductors 450 circulates an alternating current of predetermined amplitude and frequency, thus creating a magnetic field 151 of known characteristics 158. This is a magnetic field created by the means of magnetic induction field couplers as opposed to radiating dipole antennas.

The preferred embodiment for coupler design is to use a small loop tuned to resonate at the RFID carrier frequency and to use only the close-in near field for communication. This field is termed the quasi static field and is analyzed as a static magnetic field that does not radiate. The fact that the loop radius is a small fraction of a wavelength means that its field pattern looks like a toroid as shown in FIG. 1 (*e*). Far field radiation is extremely weak until the loop is built with a radius greater than 0.5 of a wavelength.

The loop couplers are positioned as shown in the 2 D cross section view (FIG. 2). Two Couplers are shown. The magnetic field lines of flux 152 and 156 are shown for an energized coupler 157. This drawing is approximately to scale showing the relative position of couplers incorporated into the modified Black Jack table. The zone used for communication is vertically above the coupler 157.

Lines with upward arrows are considered positive; lines with downward arrows are considered negative. It should be noted that there is a significant field falling through the coupler position on the right side of the energized coupler.

To be able to read the RFID chip, the magnetic flux density that the inlay 401 "sees" must exceed a certain threshold level for activation. For the chip types used, this is approximately 0.1 micro-tesla. FIG. 2 (*b*) is a plot of the flux density along a line 153 above the coupler at a height of about 3 inches. This is equivalent to a height of 20 chips. The plot is scaled with 0.2 micro-tesla/division along the vertical axis 158. The coupler is driven with sufficient power (current) to ensure at least 10× the required minimum read threshold 160 so the chip can also be reliably "written" and that there is sufficient margin to compensate for the resonant splitting effect (hence reduced circuit gain) of a stack of chips.

FIG. 2 (*c*) 163 is a plot of the flux density along the lower plot line (154). This shows that the flux density is sufficient to activate a chip, i.e. (it is above the threshold 161) placed in the adjacent betting zone. It does not matter for the chip inlay whether the flux is positive or negative (162).

Figure 5:
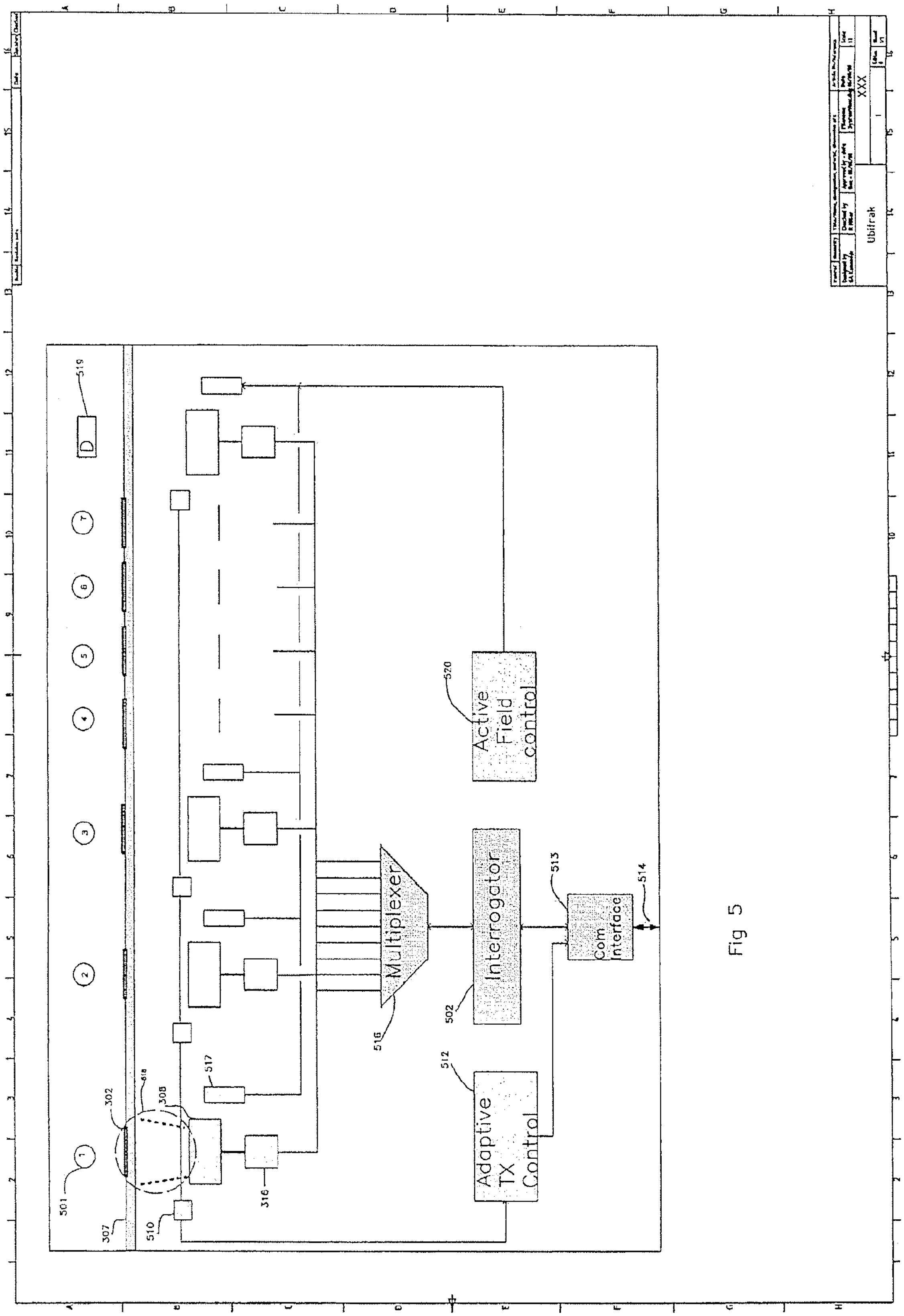
FIG. 5 is a system block diagram of the present invention.

As shown in FIG. 2 and as explained above, there are 2 conflicting requirements. It is necessary to have a sufficiently strong field to activate chips in a stack yet not activate chips in a nearby adjacent betting zone. It is the nature of the magnetic field pattern that sharp cut-offs cannot be obtained by ordinary methods. This invention includes the use of an auxiliary coupler (FIG. 5 #517) and a field control circuit (FIG. 5 #519). This feature prevents the chips outside the zone from being read.

If needed, current circulating in the conductors might also be phase, frequency, time or code modulated so as to introduce data transmission capabilities towards the gaming chips 301.

Figure 3B:
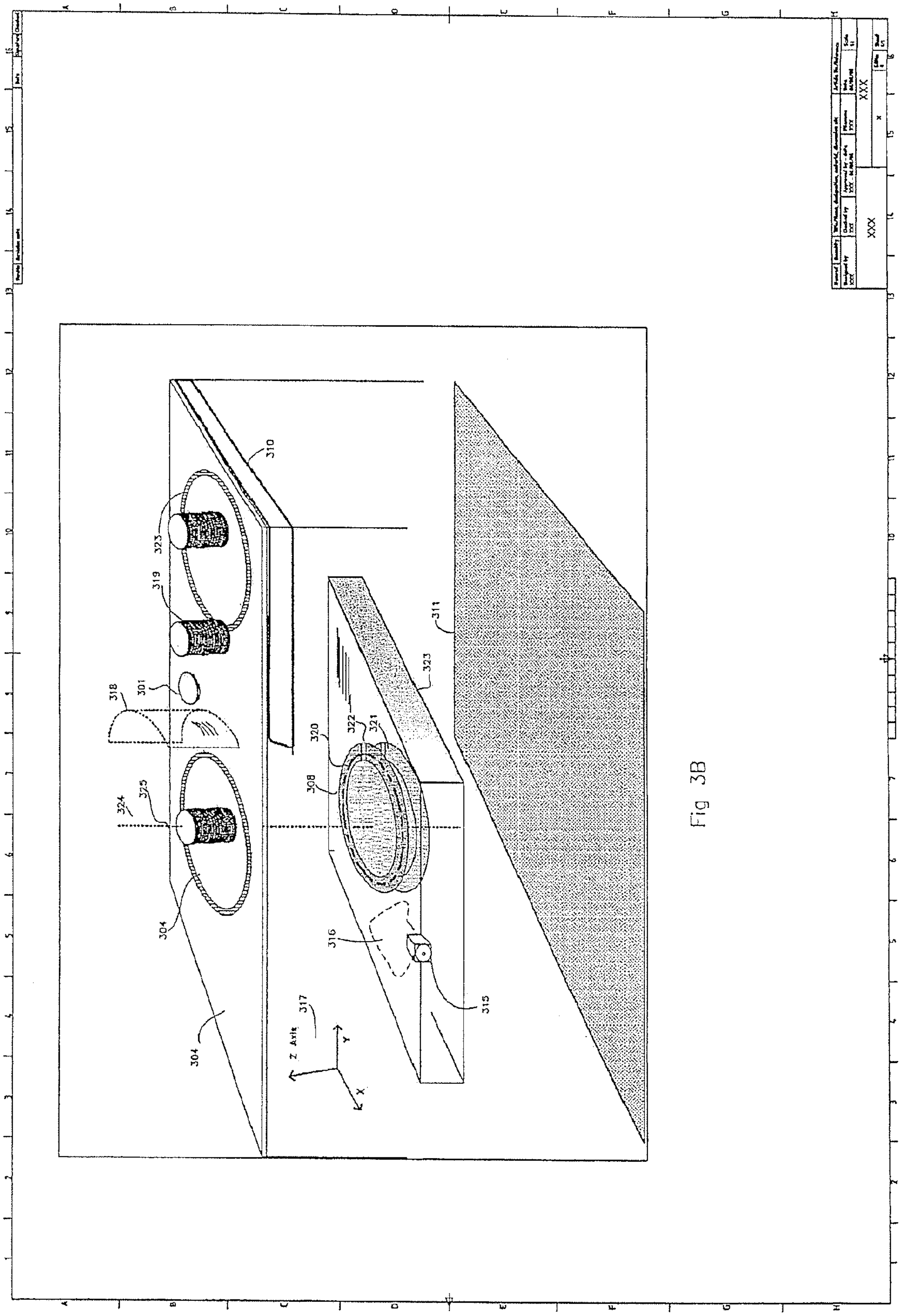
FIG. 3B is an exploded view of a Black Jack Gaming table that provides insight in one typical embodiment of the present invention. The printed circuit board carrying the coupling conductors as well as the shielding layer underneath the table is visible on this drawing.
Figure 4:
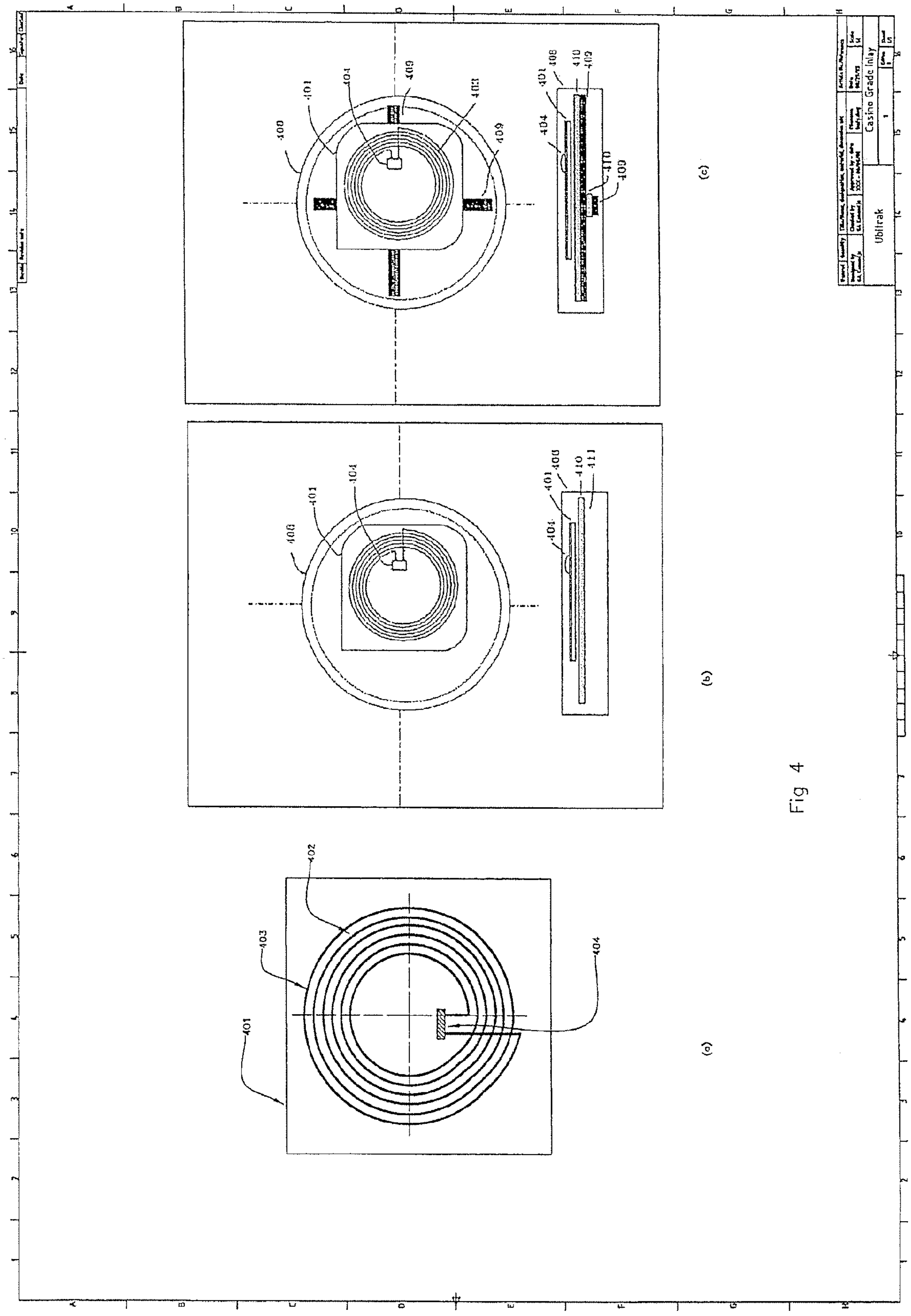
FIG. 4 (*a*) depicts the inlay that carries the secondary loop and the integrated circuit attached to the secondary loop.

FIG. 3B is an exploded view of the gaming table illustrating 2 typical betting zones and the relative placement of the key elements. For convenience the coordinate system (317) shows the Z-axis as normal to the table.

The table is a standard gaming table with top surface felt (304), betting area delineation, typically a circle (302), and base material (310), typically wood. To this table is added coupler circuit board of which (323) is the type for the primary coupler. This is aligned (324) under communication zone (betting area) (302). Each betting zone and the dealer area will have a primary coupler.

The primary coupler circuit board (323) is at least a 4 layer board with the top and bottom surfaces shielded grounds (320) and (321). These shields must have a gap to avoid creating a complete eddy current path. The loop circuit may be one or 2 turns (320). The circuit board also includes tuning and matching components to 50 ohms. (316). An SMB connector (315) is used to connect this board to the Reader (not shown).

Shown below the coupler board is a screen layer (311) fabricated of mesh or continuous conductive material. The separation from the coupler circuit board must be several inches and the coupler board resonance frequency must be tuned with this shield in place.

A typical chip stack (325) of 20 chips is shown in the betting area (302). When reading the chips in the zone (302)

the invention ensures that chips (301) and (319) in adjacent zones are not also read. The boundary of the communication zone is defined completely around each betting circle at a distance of 1 chip diameter. This is partially shown as (318). Chip (301) lies outside the zone of (302) and is not read when the chips of stack (325) are interrogated.

On the top side, the gaming table is sealed with a protective coating 309 in order to prevent liquids from pouring into the underlying circuitry layer 310.

Gaming chips 408 are provided with a looped conductor 403, through which currents induced by magnetic coupling by the table looped conductor and by the other gaming chips looped conductors circulate (secondary loops). The gaming chips further include an integrated circuit 404 containing the appropriate gaming chip identification data, capable of generating signals which can be used to transmit such data by magnetic coupling. If required, the integrated circuit can also include a functionality allowing the updating of the data in a memory according to instructions embedded in the modulation of the signals received from the primary loop through magnetic coupling. The track width, the inter track gap 402 as well as the track thickness and the number of track per looped conductor 403 and the resonant frequency are chosen so as to allow consistent and accurate reading from the gaming table and writing into the gaming chips when these are stacked up. Minimum stack height in this context is set to 20 high.

An deep insight into the overall system behavior of the invention disclosed in this patent can be gained by considering the block diagram of FIG. 5. Using Black Jack as the preferred embodiment, player chips are placed on the betting areas indicated by 1 to 7 501 where the indicated zones 302 are marked on the table top 307. Zone "D" 519 is a similar zone used by the dealer to read chips that may be collected or paid or to initialize chips with player's names as optionally decided by the casino operator.

The Interrogator (Reader) (502) initiates the scanning process controlling multiplexer (516) which routes signals and receives responses through each coupler (308) in turn. The Interrogator (502) sends reformatted data read from the chips through the communications interface circuit (513) and communications link (514) to a host computer. Typical embodiments of the interface circuits and communication links are wireless; EtherNet; RS 232; or RS 485 channels. The host computer may be centralized in the Casino facility or distributed to the "pit boss" areas.

Self-test couplers (510) associated with each primary coupler 308 monitor the local level of the magnetic field and are connected to the Adaptive control circuit (512). By monitoring this data, the Interrogator transmitted power can be adaptively varied and monitored for failures. This circuit is also used to detect and warn of extraneous signals that may be an attempt to interfere with the System operation.

The System also includes magnetic field control couplers (517) near each primary coupler (308). As described earlier in the discussion of magnetic field flux density, (FIG. 2 #153, 162) it is necessary to use active circuit methods to prevent reading of chips beyond the desired read zone. The circuitry that accomplishes this packaged in the block labeled Active Field Control (520). This circuit is activated continuously during operation.

For better understanding of the present invention, the basic concept underlying the magnetic coupling is presented in the following lines.

When coupler loops are placed in close proximity, as in the case for the reader coupler and chip, and each loop is individually tuned to resonance a phenomenon known as "resonance splitting" occurs. Each coupler is an LC resonant circuit and linked by magnetic flux which results in Mutual inductance M. The resultant resonance frequency is split into 2 according to the following equation:

$$F_1=\tfrac{1}{2}*\mathrm{pi}*\mathrm{sqrt}\{(L-M)*C\}$$

$$F_2=\tfrac{1}{2}*\mathrm{pi}*\mathrm{sqrt}\{(L+M)*C$$

Where L is the inductance of the primary loop
M is the mutual inductance referred to the primary
C is the loop resonant capacitor
F1, F2 are the resonance frequencies This coupling behavior motivates the effort of carefully designing the coil of the secondary loop inductor. Since the resulting resonance frequency of a stack might be far below the working frequency if no special attention is paid in this context.

Figure 6:
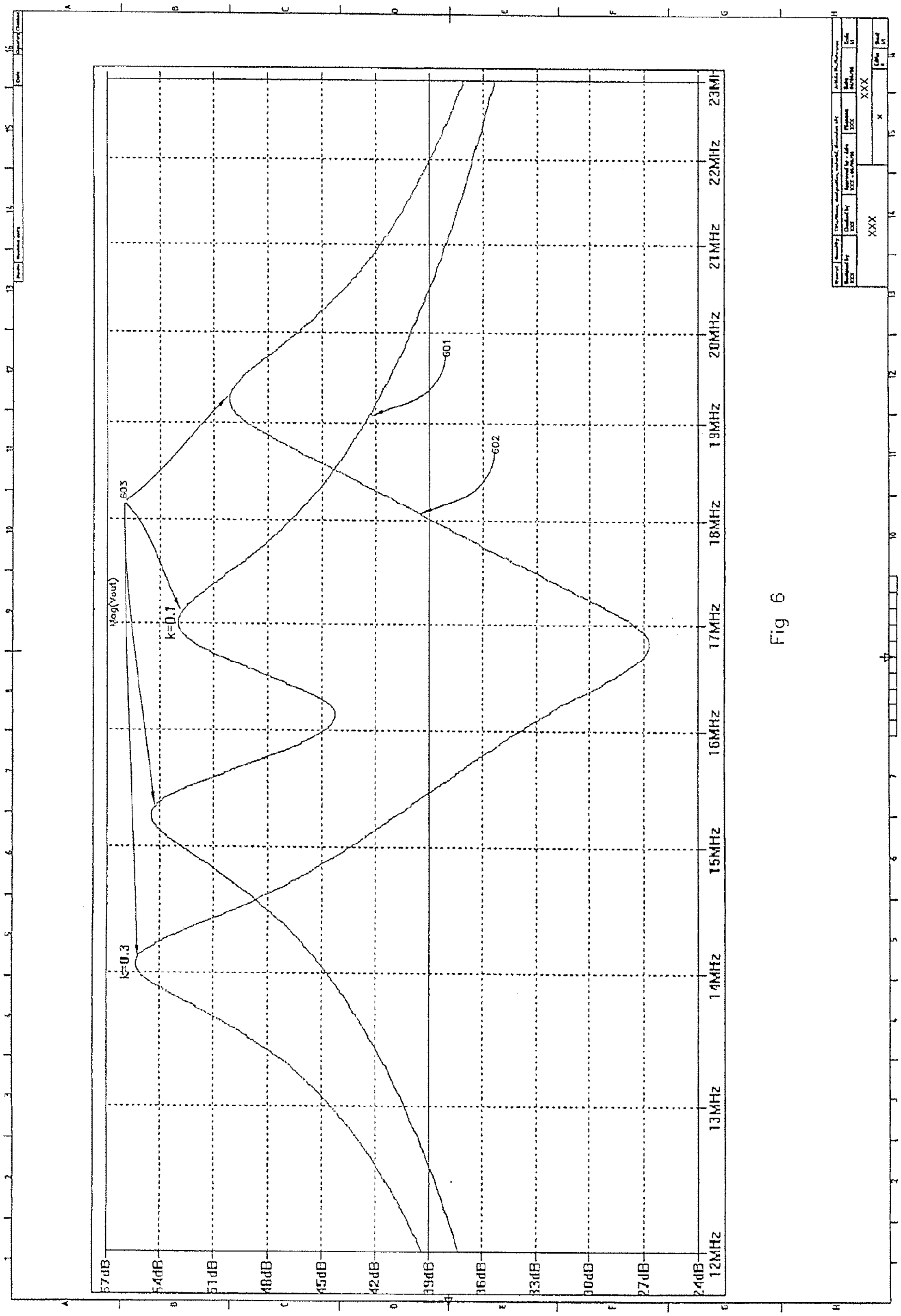
FIG. 6 illustrates the resonance splitting phenomena that occurs when two couplers are in close vicinity.

FIG. 6 depicts an example of resonance splitting that occurs with 2 loops tuned to resonate around 13.5 MHz. The two curves 601 and 602 illustrate the coupling behavior under two different coupling conditions (represented by the coupling factor K). In the first case (curve 601) the two loops are loosely coupled. In this case, the resulting resonant frequencies are very close to one another meanwhile in the second case, where the coupling between the loops is tighter the resulting frequencies are far apart from one another.

The lower frequency is the condition when the currents in each loop are in phase and the higher frequency is the condition when the currents are anti-phase.

Figure 7:
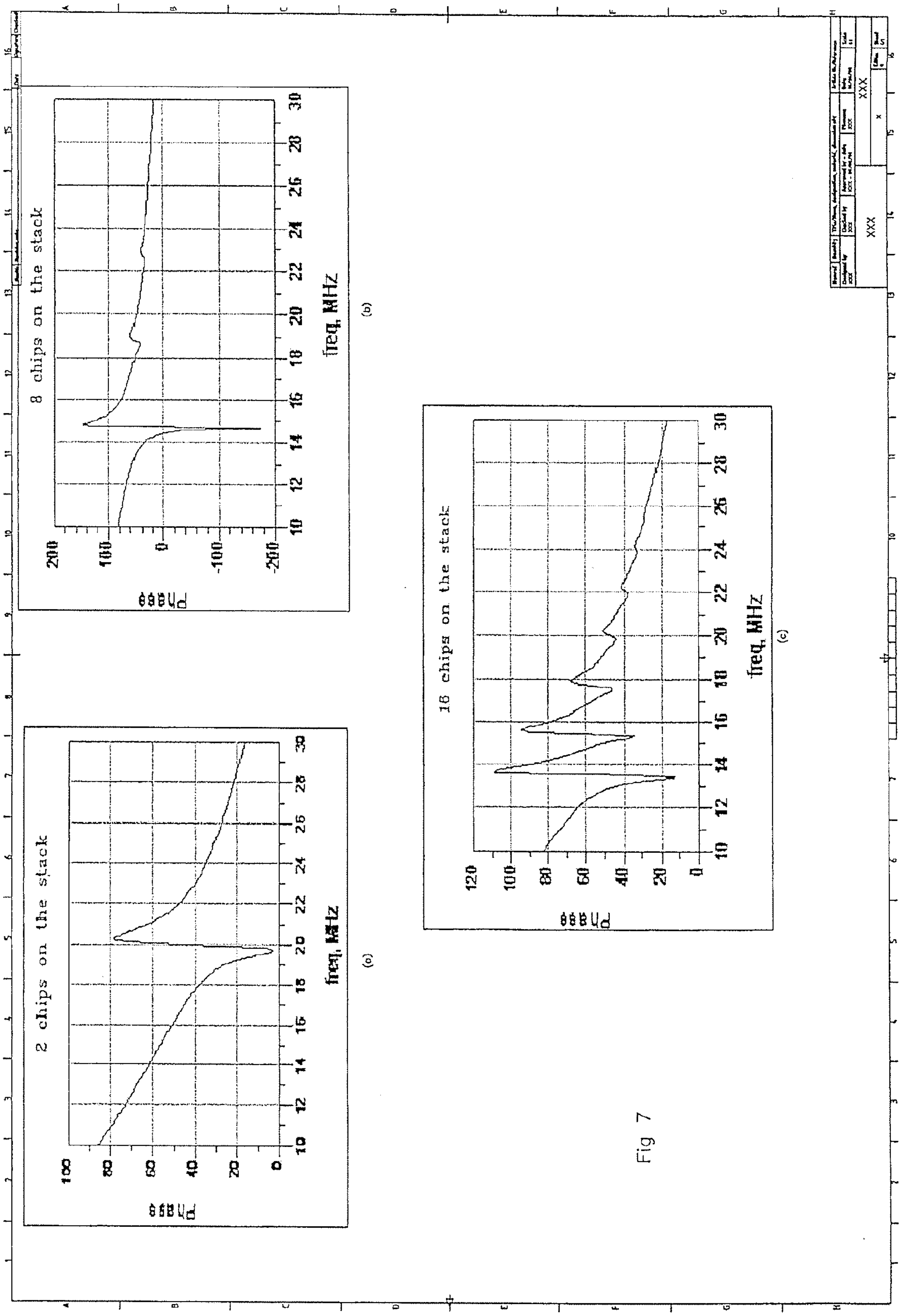
FIG. 7 depicts the resonance behavior of chips stacks.

FIG. 7 illustrates what happens when chips are stacked. The higher frequency is beyond the range of the plot. The resonance frequency is the dip in the curve closest to 0 degree phase shift. When only 2 chips are on the stack FIG. 7 (*a*), the lowest resonance frequency is around 20 MHz.

Figure 8:
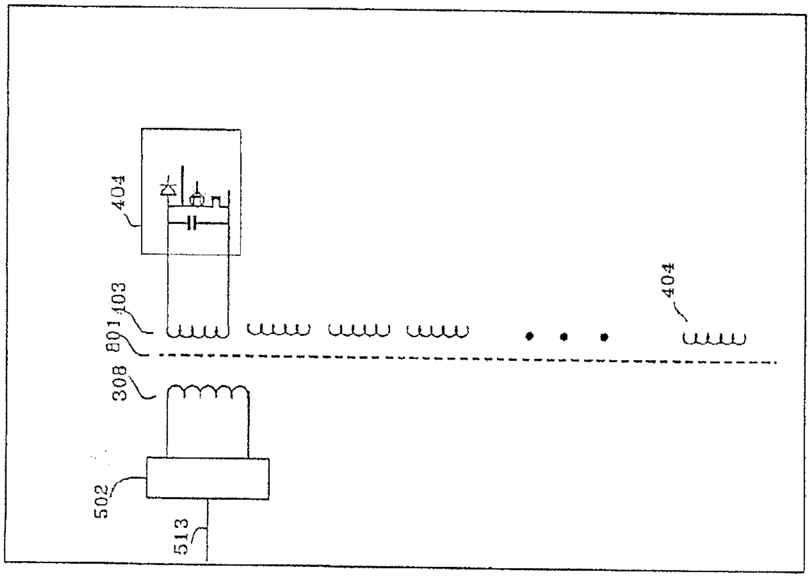
FIG. 8 illustrates the magnetic coupling concept that underlies this invention.

As additional chips are stacked FIG. 7 *b* and *c*, it can be seen that the first resonance approaches and eventually reaches 13 MHz which is our desired operating frequency. FIG. 8 is the magnetic circuit for this situation. Each chip is loosely coupled to the primary loop and also tightly to each other. The basis of this aspect of the invention is to select a single chip resonance frequency which allows the stacking effect to bring it down as close as possible to 13.5 MHz.

In the preferred embodiment, the design frequency is 22 MHz. The chip inlay loop diameter is selected to capture sufficient coupling energy to activate the internal microchip when the chip is at the top of a stack. This must also allow for the divergence and decrease in magnetic field at this height above the gaming table surface. Also the inlay loop diameter is restricted by the finished size of the gaming chip, typically 39 mm. It is also desired to minimize the mutual inductance M by off-centering the inlay in the chip as show in FIG. 4.

Additional anti-theft protection can also be included inside the gaming chip. This anti-theft protection may include the provision of an appropriate resonating material such as (but not limited to) nickel strips 409, whereby the nickel strips are arranged to form a cross so as to increase detection at the resonator. The nickel strips 409 are deposited in the gaming chip cavity 410 before encapsulation. The metal strip should be deposited below the secondary conductor loop in a way to prevent the strip from short-circuiting the loop tracks.

The main advantage of such a system is that, unlike other systems that have been proposed in the past, it is possible to determine exactly whether a gaming chip is inside or outside a specified zone. As the flux lines of a magnetic field diverge rapidly outside the zone in which the primary loop is installed, a gaming chip placed outside the zone will simply not be "seen" by the system.

Such a precision cannot be obtained with optical or radio frequency based systems as any passing obstacle, such as a hand, a glass, a stick or any other object that can be present in the zone, can significantly disturb their coverage characteristics. Furthermore, magnetic coupled technology is less obtrusive and more affordable and reliable.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A system for permitting identification and counting of gaming chips, comprising:

(a) a set of gaming chips, each gaming chip of said set of gaming chips including at least one gaming chip inlay assembly containing at least one looped conductor in the form of a spiral inductor and an integrated circuit operatively connected to said looped conductor so that the resulting resonance frequency is higher than the RFID carrier frequency to compensate for the effect of stacking chips to up to 20 high, said integrated circuit also storing identification data; and (b) a gaming table provided with a primary looped conductor for each of at least two gaming read zones on said gaming table and an electronic module operatively associated with each looped conductor, said electronic module being arranged to provide a current of predetermined amplitude and frequency to each of the primary looped conductors in order to induce a magnetic field and receive and interpret a signal received, wherein the primary loop conductor is configured to allow reading the data stored in stacked gaming chips or single chips of the set of gaming chips disposed within a desired read zone;

(c) whereby said system is operable such that, when one of said gaming chips is in the vicinity of one of said primary looped conductors, near field magnetic coupling occurs between the looped conductor of said gaming chip and said primary looped conductor, whereby information is transmitted from said gaming chip to said electronic module in the form of a signal, wherein the system is characterized in that it further comprises an active circuit arrangement including an active field control circuit connected to magnetic field control couplers positioned near to each primary looped conductor, wherein the active circuit arrangement is operable to use active circuit methods for preventing the receiving of signals by each primary looped conductor from beyond a desired read zone.

2. The system of claim 1, wherein the data stored in each gaming chip represents an identifier and an amount, the electronic module being configured to add the amount stored in each gaming chip and generate a sum, the electronic control system being further configured to associate the sum with the identifier.

3. The system of claim 1, wherein the primary loop conductor is characterized by a length that is less than or equal to 1/10 of a wavelength of the magnetic field.

4. The system of claim 1, wherein the looped conductors of the gaming chip inlays are comprised of any one or more of the following types of material selected from the group consisting of conducting wire, cable, rigid printed circuit board and flexible printed circuit board.

5. The system of claim 1, wherein the primary loop conductors are comprised of conducting wire, cable, and rigid or flexible printed circuit board.

6. The system of claim 1, wherein the looped conductors of the gaming chips incorporate ferrite pieces of various shapes and sizes to define the extent of the magnetic field.

7. The system of claim 1, wherein the primary loop conductors incorporate ferrite pieces of various shapes and sizes to define the extent of the magnetic field.

8. The system of claim 1, operable such that at least one of the primary loop conductors is continuously energized.

9. The system of claim 8, wherein a portion of the plurality of primary looped conductors not including the continuously energized primary loop conductor are sequentially energized.

10. The system of claim 1, wherein each gaming chip comprises two crossed magnetic metal strips configured to be detected by either EAS systems or metal detectors.

11. The system of claim 1, wherein the primary looped conductors and the looped conductor in each gaming chip is designed to make use of near field magnetic coupling, where the looped conductors have a length less than 1/10 wavelength.

12. The system of claim 1, wherein the primary looped conductors are disposed in planar orientations.

13. The system of claim 1, wherein the primary looped conductors are disposed in an overlapping or an orthogonal orientation below the top of the gaming table.

14. The system of claim 1, wherein the primary looped conductors are configured to maximize magnetic coupling in the desired read zone and minimize magnetic coupling outside of the desired read zone.

15. The system of claim 1, wherein said looped conductors of said gaming chips are arranged to minimize mutual coupling between chips when said chips are stacked.

16. The system of claim 1, wherein the active circuit arrangement is configured to employ measurements of magnetic field strength adjacent to each primary looped conductor to adaptively control the magnetic field strength.

17. The system of claim 1, wherein the active circuit arrangement controls the magnetic field to eliminate cross reading of an adjacent read zone.

18. The system of claim 1 wherein the active circuit arrangement is configured to selectively drive each magnetic field control coupler to prevent the corresponding primary looped conductor from reading data stored within any gaming chip not disposed in the desired read zone.

19. The system of claim 1, wherein the spiral inductor formed by the looped conductor of the gaming chip inlay can be selected from the group consisting of circular, elliptical, square, rectangular and fractal snowflake-like spiral shapes.

20. The system of claim 1, wherein any single chip resonance frequency that allows the stacking effect to bring the combined resonance frequency close to approximately 13.5 MHz.

21. The system of claim 1, wherein the resulting resonant frequency of a gaming chip inlay is about 22 MHz.

* * * * *